(12) United States Patent
Choi (10) Patent No.: US 9,866,710 B2
(45) Date of Patent: Jan. 9, 2018

(54) DATA STORING AND TREND DISPLAY IMAGE MONITORING APPARATUS USING IMAGE PROCESSING BOARD

(71) Applicant: H.C.Tech Co. Ltd., Daegu-shi (KR)

(72) Inventor: Hong Choi, Daegu (KR)

( * ) Notice: Subject to any disclaimer, the term of this patent is extended or adjusted under 35 U.S.C. 154(b) by 431 days.

(21) Appl. No.: 14/562,597

(22) Filed: Dec. 5, 2014

(65) Prior Publication Data
US 2015/0229785 A1    Aug. 13, 2015

(30) Foreign Application Priority Data
Feb. 7, 2014  (KR) .......................... 10-2014-0014181

(51) Int. Cl.
| | | |
|---|---|---|
| G06K 9/36 | (2006.01) | |
| H04N 1/00 | (2006.01) | |
| H04N 5/232 | (2006.01) | |

(52) U.S. Cl.
CPC ........... H04N 1/00323 (2013.01); G06K 9/36 (2013.01); H04N 5/23206 (2013.01)

(58) Field of Classification Search
CPC ........... H04N 1/00323; H04N 5/23206; H04N 21/4334; H04N 21/4621; H04N 5/4448; H04N 5/46; H04N 9/641; H04N 9/642; H04N 7/147; H04N 5/232; H04N 5/23222; H04N 5/235; H04N 19/44; H04N 21/4223; H04N 5/23203; H04N 5/772; H04N 5/91; H04N 5/2258; H04N 21/4183; H04H 20/10; H04H 60/27; A63F 2300/1093; A63F 2300/6045; G06K 9/00375; G07F 17/3209; G09G 2320/0626; G09G 2340/02;

(Continued)

(56) References Cited

U.S. PATENT DOCUMENTS 5,826,035 A * 10/1998 Hamada ................... G06T 1/20
                                                         345/2.1
5,841,763 A * 11/1998 Leondires ............... H04M 3/56
                                                         348/14.08

(Continued)

FOREIGN PATENT DOCUMENTS

| KR | 10-2005-0100876 | 6/2012 |
|----|-----------------|--------|
| KR | 10-1296815      | 8/2013 |

OTHER PUBLICATIONS

English abstract of 10-2005-0100876.
English abstract of 10-1296815.

*Primary Examiner* — Aklilu Woldemariam
(74) *Attorney, Agent, or Firm* — Antonio Ha & U.S. Patent, LLC (57) ABSTRACT

An image monitoring apparatus comprises a camera, an image processing board, a control system, and a display apparatus. The image processing board comprises a DSP compressing a first signal received from the camera into image data, a first memory storing the image data, an MCU pre-processing a second signal received from an external device through an I/O port into pre-processed data, a CPU processing the pre-processed data into a first database or a third signal received from the control system through a communication port into a second database, and a second memory storing the first database or the second database. The image processing board transmits the image data and the first database or the second database to the display apparatus, so that a text or a graph corresponding to the first database or the second database is displayed overlaid on an image corresponding to the image data.

8 Claims, 6 Drawing Sheets

(58) Field of Classification Search
CPC .. G09G 5/005; G09G 2360/126; G09G 5/363; G09G 5/003; G09G 2360/06; G09G 3/003; G09G 5/00; G09G 2320/068; G09G 2320/103; G09G 2340/0471; G09G 2340/0478; G09G 2340/0492; G09G 2370/04; G09G 5/38; G09G 5/391; A61B 1/00009; A61B 1/0005; A61B 5/7232; A61B 1/015; A61B 1/0011; G02B 23/2484; C02F 2209/02; C02F 2209/03; G06Q 30/0601; G08B 13/19645; G08B 13/19658; G08B 13/19689; H04M 3/42; H04M 3/563; G06F 3/1446; G03B 37/005
USPC ......... 382/232; 725/100, 131, 151; 348/207, 348/531, 554, 571
See application file for complete search history.

(56) References Cited

U.S. PATENT DOCUMENTS

| | | | | |
|---|---|---|---|---|
| 5,961,831 A | * | 10/1999 | Lee | A01K 63/042 119/204 |
| 6,747,554 B1 | * | 6/2004 | Higashimura | G08B 13/19645 340/506 |
| 7,623,152 B1 | * | 11/2009 | Kaplinsky | H04N 5/232 348/155 |
| 2005/0099500 A1 | * | 5/2005 | Fujita | H04N 5/23206 348/207.99 |
| 2005/0151838 A1 | * | 7/2005 | Fujita | G06T 1/00 348/39 |
| 2006/0007318 A1 | * | 1/2006 | Kanayama | H04N 1/00212 348/211.3 |
| 2006/0053463 A1 | * | 3/2006 | Choi | H04N 21/4753 725/131 |
| 2007/0132836 A1 | * | 6/2007 | Katz | G06Q 20/208 348/14.01 |
| 2010/0045594 A1 | * | 2/2010 | Jenks | H04N 9/12 345/156 |
| 2013/0016119 A1 | * | 1/2013 | Ukawa | G09G 5/005 345/589 |
| 2013/0117078 A1 | * | 5/2013 | Weik, III | G06Q 10/00 705/13 |
| 2014/0296866 A1 | * | 10/2014 | Salman | A61B 1/018 606/109 |
| 2014/0333743 A1 | * | 11/2014 | Gilreath | A61B 1/00009 348/74 |

\* cited by examiner

Fig. 1

(Related Art)

DATA STORING AND TREND DISPLAY IMAGE MONITORING APPARATUS USING IMAGE PROCESSING BOARD

CROSS-REFERENCE TO RELATED APPLICATIONS

This patent application claims priority under 35 U.S.C. §119 to Korean Patent Application No. 10-2014-0014181, filed on Feb. 7, 2014, in the Korean Intellectual Property Office, the disclosure of which is incorporated by reference herein in its entirety.

TECHNICAL FIELD

Embodiments of the present disclosure relates to image monitoring apparatuses, and more specifically, to an image processing board, which includes various external input/output ports for enabling connection and control of various external devices and various communication ports for enabling a connection with a control system over a network and which may be embedded in a camera, and an image monitoring apparatus using the image processing board.

DISCUSSION OF RELATED ART

Image monitoring apparatuses are widely used for monitoring variations in the circumstance, such as, e.g., water level, temperature, moisture, etc., in a particular area. A conventional image monitoring apparatus simply includes a camera, an image processing board connected with the camera, an NVR (Network Video Recorder) connected with the image processing board, and a control system connected with the NVR. There is increased demand for an implementation of enabling compact and easy-to-use configuration, compatibility with various external devices adopting different input/output or communication protocols, and processing and displaying information on a monitored area in the form of a text or graph, alongside a captured image of the area in the image monitoring industry. Thus, a need exists for an image monitoring system that may respond to such demand.

SUMMARY

According to an embodiment of the present disclosure, an image monitoring apparatus using an image processing board, comprising: a digital signal processor (DSP) chip; a synchronous dynamic random access memory (SDRAM); an external storage unit, an RS-232/485 communication port; a TCP/IP LAN port; and a multipoint control unit (MCU) external input/output port, wherein the image processing board is configured to support various protocols of an external device communicating with a control system through RS-485 communication, a LAN, or a Modbus, wherein data processed by the image processing board is displayed by a network video recorder (NVR) on a monitor as a situation including a water level, a temperature, and a pressure, wherein when a dangerous or alert situation occurs, a message is displayed on the monitor or an overall screen of the monitor flickers, wherein the image processing board further includes a port for controlling digital output, contact output, and an alert, a digital port an analog input port, an RS-485 communication port, an LAN port, and an audio port, and wherein the image processing board is configured to simultaneously perform an image processing function and an external device control function.

The image processing board is configured to encode an compressed image and input data together with image data and to send the encoded data to the NVR, and wherein the NVR including a decoder is configured to restore the compressed image, and the NVR is configured to display various input data including a temperature and a pressure received from the external device on a lower portion of the monitor.

When the dangerous or alert situation occurs, the displayed message flickers in a predetermined color, or the overall screen flickers in a predetermined color or in black and white with the displayed message remaining in a predetermined color.

The image monitoring apparatus is configured to, when the dangerous or alert situation occurs, announce the dangerous or alert situation through a speaker and send a text message or a voice message to a manager.

The NVR includes a plurality of image display apparatuses, wherein the image processing board is connected with one of the plurality of image display apparatuses, and wherein when a water level or amount in a predetermined area reaches a predetermined value, an emergency broadcast is provided to the predetermined area.

The image processing board is configured to support various protocols to receive data from a control system through the RS-232/485 communication port, the LAN port, and the external input/output port, wherein the protocols include a protocol of LSIS Co. Ltd., a Modbus, and a Profibus.

The image processing board is configured to use an image compression design method using a DSP to compress an image, and wherein the image compression design method using the DSP comprises compressing a signal received from a camera using the DSP; temporarily storing the compressed signal in the SDRAM under control of the CPU; pre-processing external data received through the external input/output port by an MCU; transmitting the pre-processed data to the CPU to create a database in the external storage unit; and transmitting the pre-processed data to the CPU through a communication or connected with a communication chip to create a database in the external storage unit, displaying text data and a trend using the database under control of the CPU, and transmitting an image to a monitoring center.

Data including a water level, a temperature, and a pressure, which are processed along with an image obtained by capturing a monitored area by the image processing board is stored as a database in the external storage apparatus, wherein the database together with the image is displayed as a data trend in the form of a text or graph on the screen, wherein the text is displayed so that predetermined values including a content, a unit, a position on the screen, a font, and a color may be configured, wherein when a trend bar displayed on the image is moved to a desired time, a time and a control system value corresponding to a position to which the trend bar is moved are displayed, and wherein after identified, the data value positioned over the trend bar automatically disappears.

When the image processing board is not positioned near a camera, a control system is connected with the camera through a network to collect data from the control system, wherein data is transmitted from the control system to the image processing board via the network and the TCP/IP LAN port of the image processing board to create a database using the transmitted data, and wherein the database, together with an image, is sent to a monitoring center and is displayed on the screen.

According to an embodiment of the present disclosure, an image monitoring apparatus, comprising:

a camera; an image processing board connected with the camera; a control system connected with the image processing board; and a display apparatus connected with the image processing board, wherein the image processing board comprises: a digital signal processor (DSP) configured to compress a first signal received from the camera into image data; a first memory configured to store the image data; a multipoint control unit (MCU) configured to pre-process a second signal received from an external device through an input output (I/O) port into pre-processed data a central processing unit (CPU) configured to process the pre-processed data into a first database or configured to process a third signal received from the control system through a communication port into a second database; and a second memory configured to store the first database or the second database, wherein the image processing board is configured to transmit the image data and the first database or the second database to the display apparatus, so that a text or a graph corresponding to the first database or the second database is displayed overlaid on an image corresponding to the image data, the text or the graph indicating a variation in a situation that occurs in an area monitored by the image monitoring apparatus.

The image processing board is connected with the control system through a network.

The image processing board is embedded in the camera.

The I/O port includes at least one of a data out port, a data in port, or an analog signal port.

The communication port includes at least one of an RS-232 communication port, an RS-485 communication port, or a LAN port.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, embodiments of the present disclosure are described with reference to the accompanying drawings. The same reference denotations may refer to the same or substantially the same elements throughout the specification and the drawings. When determined to make the subject matter of the present disclosure unclear, the detailed of the known art or functions may be skipped. Embodiments of the present disclosure are hereinafter described, but it should be appreciated that the present disclosure is not limited thereto, and various changes may be made thereto by one of ordinary skill in the art. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise.

An embodiment of the present disclosure is directed to an image compression distribution design apparatus and method using as DSP.

Figure 1:
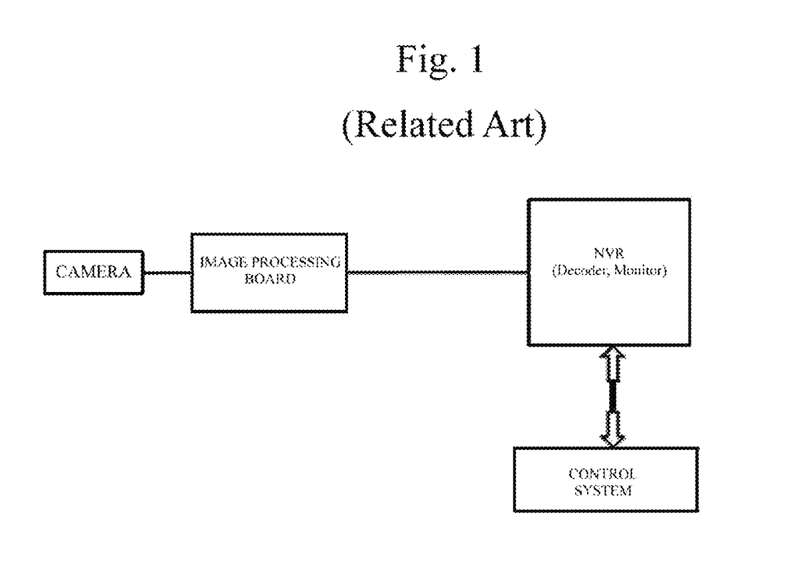
FIG. 1 is a view illustrating a configuration for processing input/output data of an external device connected with an NVR according to a related art.
Figure 2:
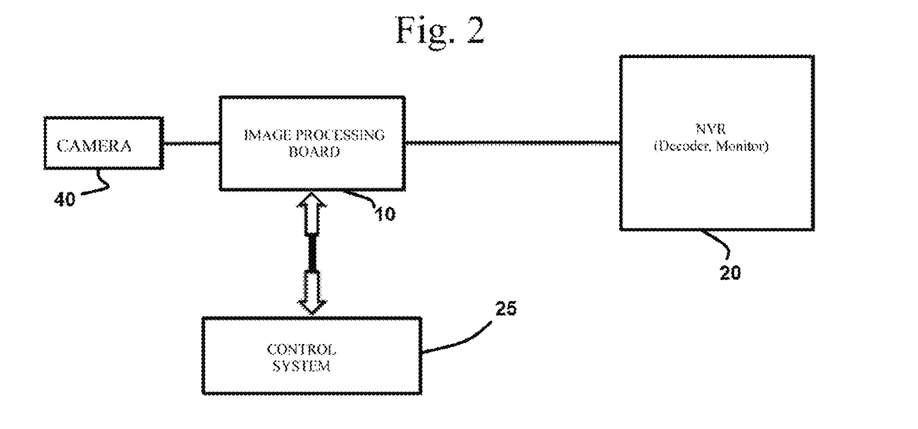
FIG. 2 is a block diagram illustrating a configuration for processing input/output data of an external device by an image processing board according to an embodiment of the present disclosure.
Figure 3:
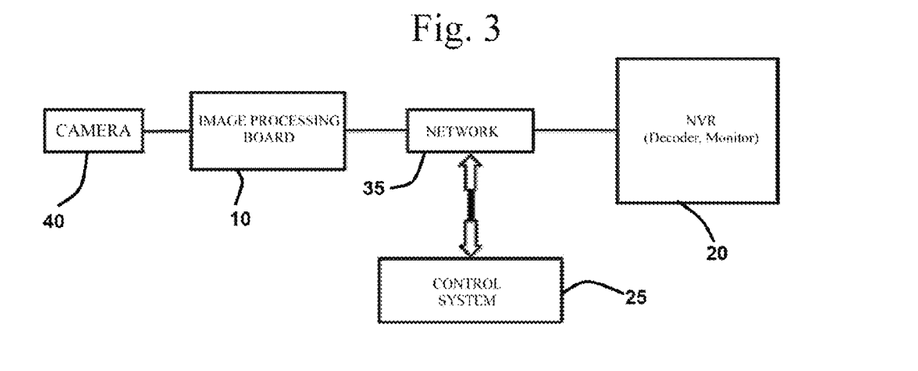
FIG. 3 is a block diagram illustrating a configuration for processing input/output data of a control system connected with a network through a TCP/IP LAN by an image processing board according to an embodiment of the present disclosure.
Figure 4:
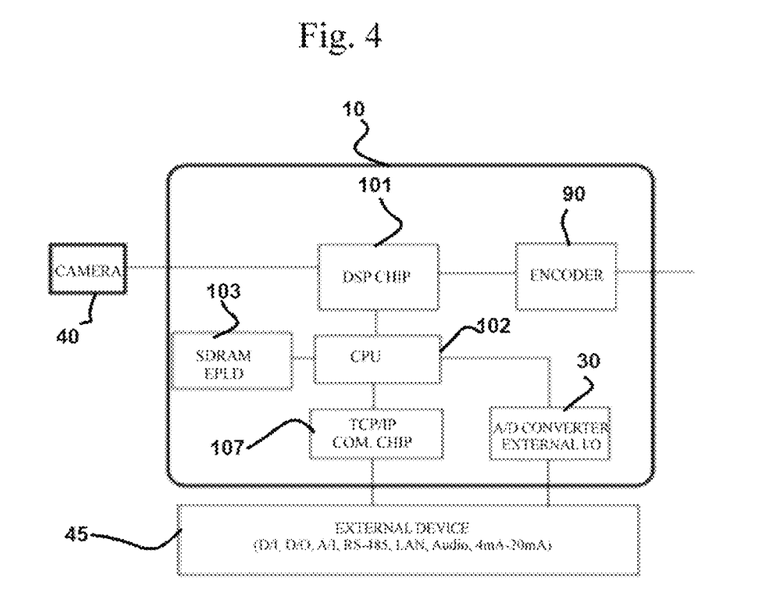
FIG. 4 is a block diagram illustrating an internal configuration of an image processing board according to an embodiment of the present disclosure.
Figure 5:
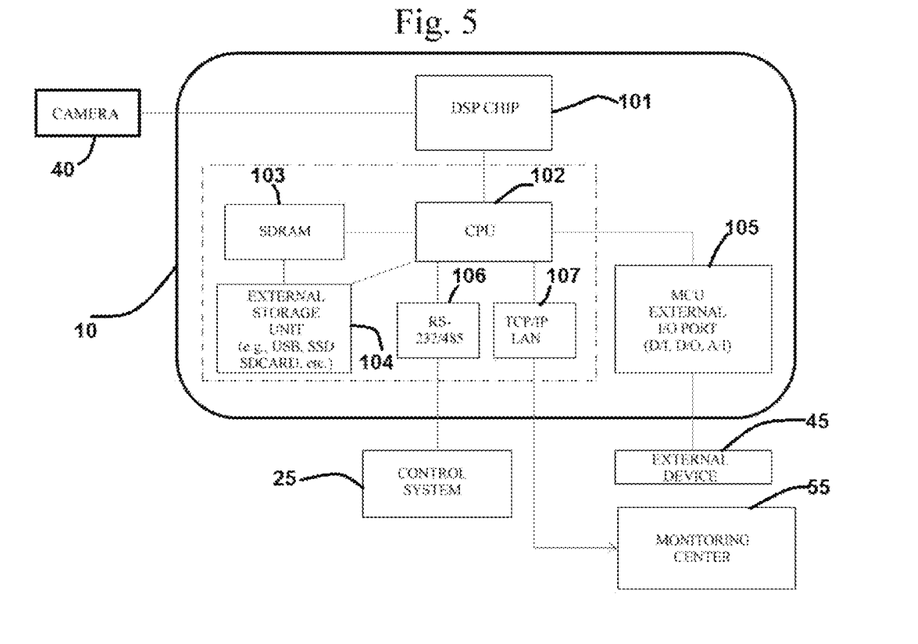
FIG. 5 is a block diagram illustrating a configuration in which a control system is connected with an image processing board according to an embodiment of the present disclosure.
Figure 6:
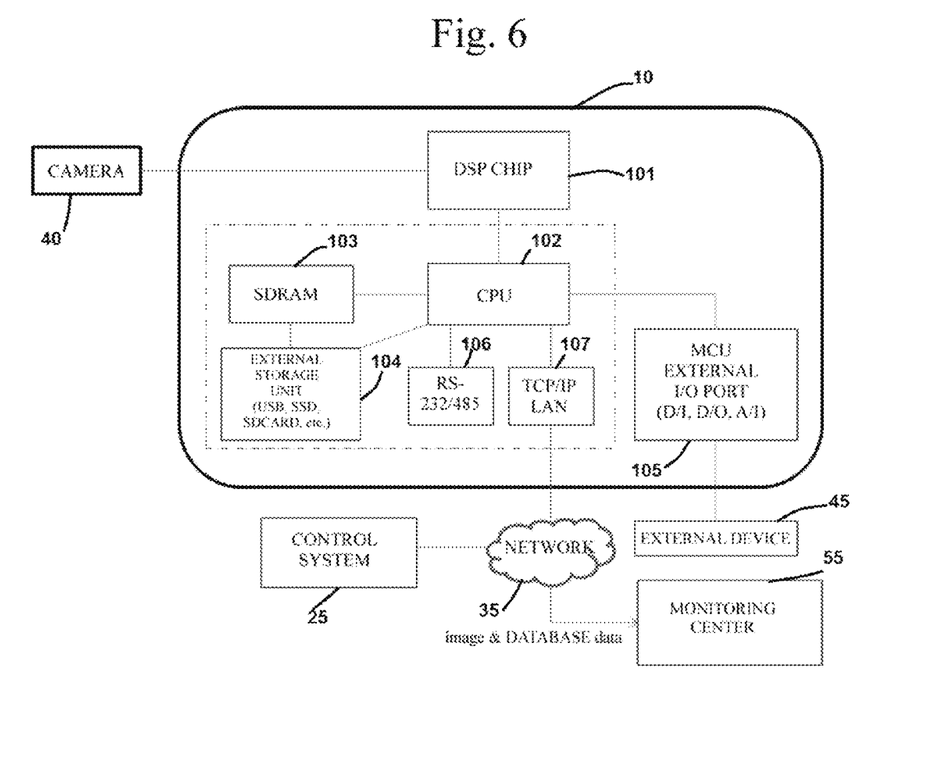
FIG. 6 is a block diagram illustrating a configuration in which an image processing board is connected with a control system through a network to communicate data with the control system, according to an embodiment of the present disclosure.
Figure 7:
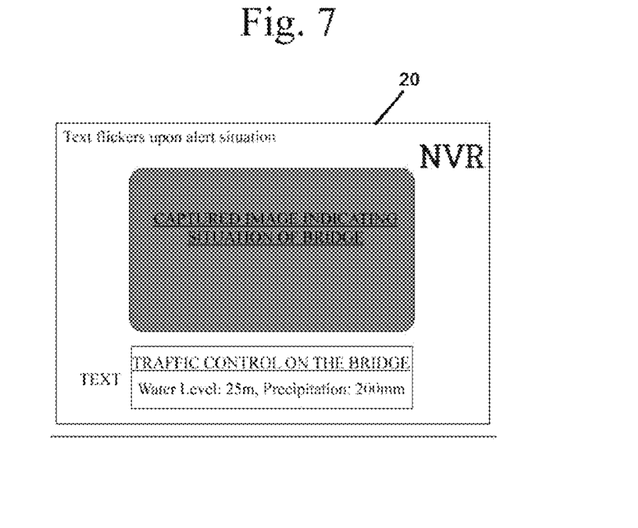
FIG. 7 is a screen view according to an embodiment of the present disclosure.
Figure 8:
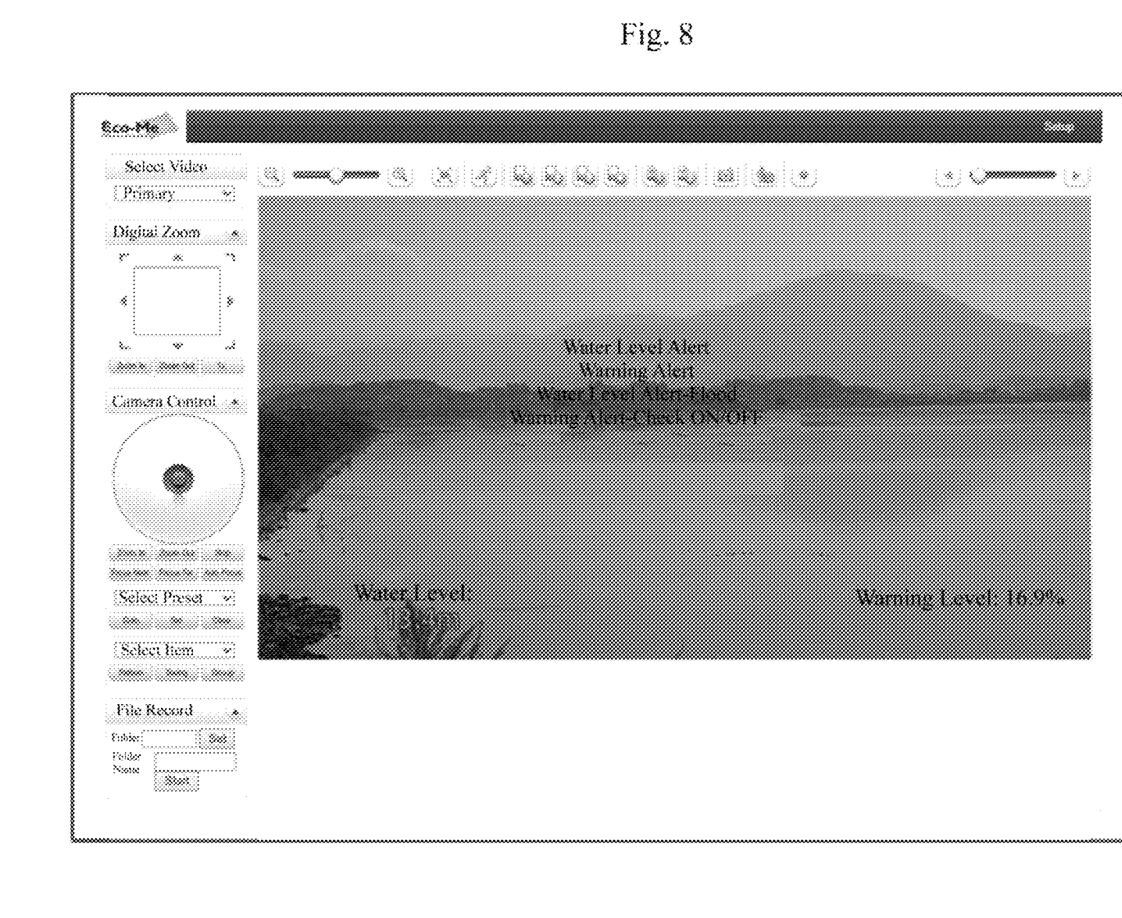
FIG. 8 is a screen view illustrating an example of displaying text and an image on the screen according to an embodiment of the present disclosure.
Figure 9:
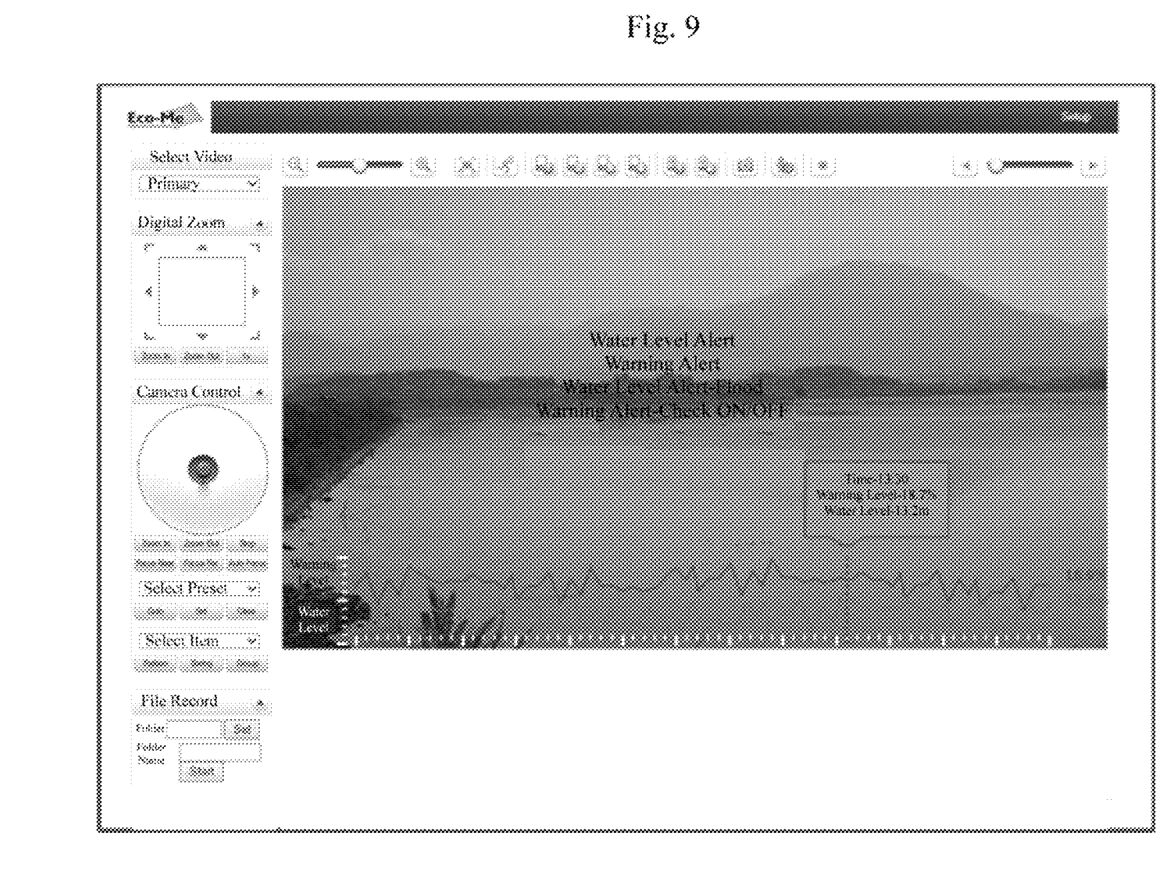
FIG. 9 is a screen view illustrating an example of displaying a data trend graph and an image on the screen according to an embodiment of the present disclosure.
Figure 10:
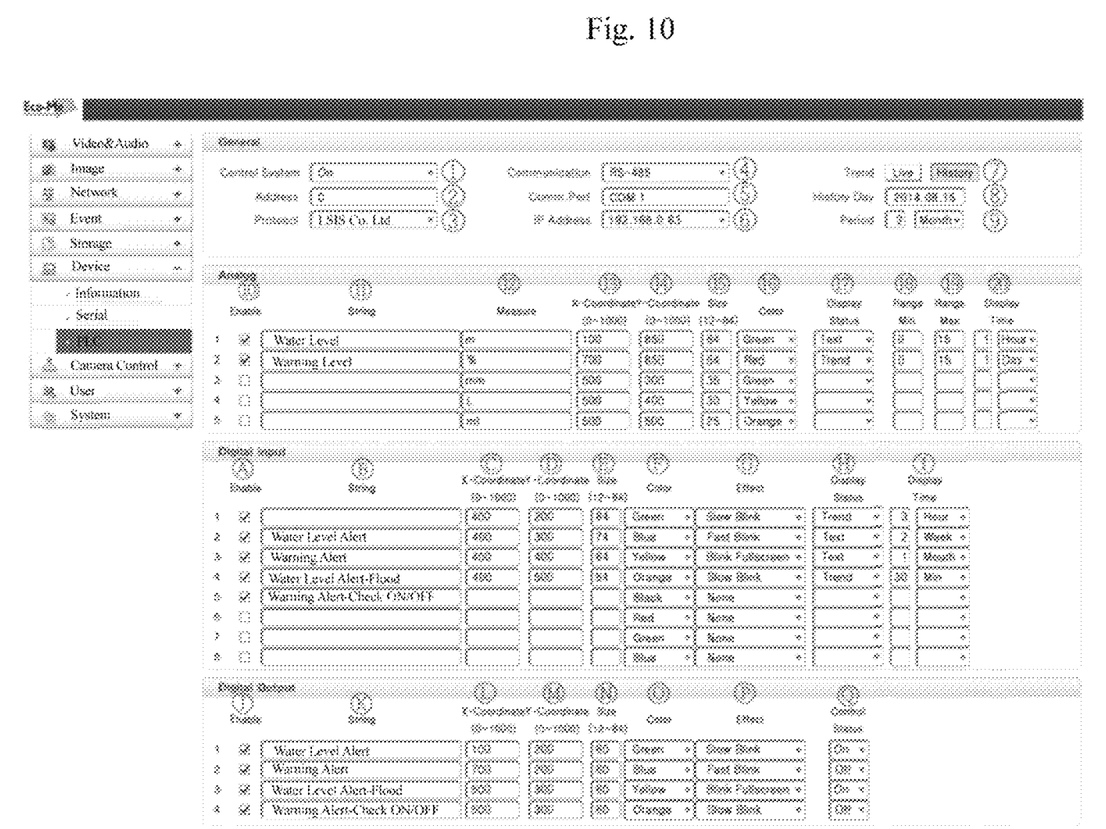
FIG. 10 is a view illustrating an exemplary software program for displaying data from a control system and controlling the control system by an image processing board, according to an embodiment of the present disclosure.

FIG. 1 is a view illustrating a configuration for processing input/output data of an external device connected with an NVR 20 according to a related art; FIG. 2 is a block diagram illustrating a configuration for processing input/output data of an external device by an image processing board 10 according to an embodiment of the present disclosure. FIG. 3 is a block diagram illustrating a configuration for processing input/output data of a control system connected with a network through a TCP/IP LAN by an image processing board 10 according to an embodiment of the present disclosure. FIG. 4 is a block diagram illustrating an internal configuration of an image processing board 10 according to an embodiment of the present disclosure. FIG. 5 is a block diagram illustrating a configuration in which a control system is connected with an image processing board 10 according to an embodiment of the present disclosure. FIG. 6 is a block diagram illustrating a configuration in which an image processing board 10 is connected with a control system through a network to communicate data with the control system, according to an embodiment of the present disclosure. FIG. 7 is a screen view according to an embodiment of the present disclosure. FIG. 8 is a screen view illustrating an example of displaying text and an image on the screen according to an embodiment of the present disclosure. FIG. 9 is a screen view illustrating an example of displaying a data trend graph and an image on the screen according to an embodiment of the present disclosure. FIG. 10 is as view illustrating an exemplary software program for displaying data from a control system and controlling the control system by an image processing board 10, according to an embodiment of the present disclosure.

In case input/output data from an external device 45 is processed by an NVR (Network Video Recorder) 20 as shown in FIG. 1, an inconvenience may occur due to the fact that the specifications or standards adopted by the NVR 20 rely on the manufacturers of the NVR 20 and thus the specifications and protocols should be previously discussed to properly display various circumstances. According to an embodiment of the present disclosure, an image processing board 10 is connected with a camera 40 to process input/output data, thus eliminating the need for discussion with the manufacturer of the NVR 20 or the need for newly developing a moans to display various situations of a monitored area in the form of a text and image, controlling, various devices, alerting a dangerous situation by displaying a flicker on the screen and sending the same to, e.g., a mobile phone through a text or voice message.

The image processing board 10 may include various external input/output ports for controlling an external device 45, such as, e.g., a data output port, a contact output port, as port for controlling alarm, a data in port, an analog input (e.g., 4 mA to 20 mA input) port, and an audio port, and various communication ports for controlling a PLC (Programmable Logic Controller) or other control systems, such as, e.g., an RS-232/485 communication port 106 and a TCP/IP LAN port 107. The image processing board 10 supports various protocols for external input/output devices. For example, the image processing board 10 supports various protocols (e.g., communication protocols developed by LSIS Co. Ltd., Modbus, etc.) through RS-485 communication or LAN communication for an external device (e.g., a PLC) or other control systems. For example, to indicate the occurrence of a major circumstance, the color of text displayed on the screen may change to a predetermined color, such as red, black, or green, the text only may flicker in a predetermined color, or the overall screen may flicker in a predetermined color with the text remaining in a predetermined color.

An image compression design method using a DSP (Digital Signal Processor) 101 (also referred to as a DSP chip) may include (a) compressing a signal received from the camera 40 using the DSP 101, (b) temporarily storing the compressed signal in an SDRAM 103 under the control of a CPU 102, (c) pre-processing external data received through an external input/output port and transmitting the pre-processed data to the CPU 102 by an MCU (Multipoint Control Unit) 105 to create a database in an external storage unit 104 or (d) transmitting data collected through a communication port (e.g., RS-232/485) connected with a communication chip to the CPU 102 to create a database in the external storage unit 104, and (e) displaying text data and a trend on an image and transmitting the same when sending the image to a monitoring center.

Digital data or analog data may be input through an external device control contact point. For example, when a water level value (e.g., 5 m) observed at a bridge is input as an analog input value, the analog input value is converted into a digital value by an A/D converter that may be positioned in or outside the camera 40, and the digital value, together with an image signal, is transmitted to a monitor, and the monitor may display, on, e.g., a set-up screen, an indication that "bridge water level is 5 m," for example.

For example, when the water level observed at the bridge is 'High,' and a digital value is input to alert a manager, the text such as "Bridge water level is HIGH" may flicker on the screen. As examples of the water level as displayed on the monitor, "H" may indicate (Level High, First Alert). "HH" (Level High, Second Alert), L (Level Low, First Alert), and LL (Level Low, Second Alert). For example, "HH" or "LL" may flicker on the screen, and an alert message may be sent to a manager's mobile phone. For example, either the overall screen or the text only may flicker.

For example, the image processing board 10 may be adopted in an image monitoring apparatus. According to an embodiment of the present disclosure, the image processing board 10 connected with the camera 40 may compress an image and send the compressed image and various control data from a control system 25, e.g., a PLC, to an image display apparatus (e.g., a monitor) 20. The image display apparatus include a decoder that may restore the compressed image. The image display apparatus 20 may display various data such as water level, temperature, or pressure, at a predetermined position of the screen m the form of, e.g., a message. The message may flicker when a dangerous or alert situation occurs in a monitored area. A plurality of image display apparatuses 20 may be provided. A single monitor 20 may be connected with the image processing board 10. The image display apparatus 20 may include an alert unit. The alert unit may include a speaker for immediate broadcast when an emergency occurs, such as when the water level or water amount reaches a hazardous situation and a communication unit for informing such emergency to managers through a text or voice message.

The image processing board 10 may be an image compression design apparatus using a DSP 101. The image monitoring apparatus may include a video decoder for receiving original image data from the camera 40 to provide A/D-converted digital image data, a DSP chip 101 (also simply referred to as a DSP) and a memory for compressing an image, a flash memory for storing, a software program, an SRAM (or SDRAM) 103 for storing the original image data, and the image processing board 10 for processing communication port data to display data, such as water level, pressure, and water quality, in the form of, e.g., text, together with an image, on the monitor 20 and transmitting the compressed image data and various data from various sensor terminals.

For example, the image processing board 10 may be positioned in or outside the camera 40. Referring to FIG. 6, a control system 25 (e.g., PLC, IoT, control board, etc.) may be positioned far away from the camera 40, and in this case, the control system 25 may be connected with the camera 40 through a network 35 to enable collection of data from the control system 25. Data may be transmitted from the control system 25 to the image processing board 10 via the network 35 and a TCP/IP LAN communication port 107 of the image processing board 10, and a database may be created using the transmitted data. The database, together with an image, may be sent to a monitoring center and may be displayed on the screen.

Data such as water level, temperature, and pressure, which have been processed, along with an image obtained by capturing a monitored area may be stored as a database in the external storage apparatus 104, and the database may be displayed as a trend in the for of a text or graph on the screen. The image may be displayed together with the data. For example, the data such as water level, temperature, and pressure, may be displayed on the screen in the form of a text or graph, with the image displayed as background. The text may be configured to have a predetermined configuration such as literal element, unit, position on screen, font, and color. Upon alert, the displayed text may flick in a predetermined color, or the overall screen may flicker in a predetermined color or black and white while the text remains in a predetermined color). When the database regarding various situations is displayed as a data trend in the form of a graph, the text may be displayed with the literal, element, unit, and color as configured by a manager. When a trend bar displayed on the image is moved to a desired time, the time and control system value at the time corresponding to the position to which the trend bar is moved are displayed. After identified, the data value positioned over the trend bar may automatically disappear.

Referring to FIG. 10, a software program for displaying, on an image, a data trend in the form of a text or graph includes a General section, an Analog section, a Digital input section, and a Digital Output section.

In the General section, general configurations are made. Control System ① is provided for selecting the type of a connected control system 25. Address ② indicates the network address of the selected control system 25, Protocol ③ is provided for selecting a protocol suitable for the control system 25, such as LSIS Co. Ltd. compatible protocols. Modbus, or Profibus, and Communication ④ is provided for selecting one of RS-232 and RS485, Comm. Port ⑤ is provided for selecting as communication port (e.g., COM1, COM2, . . . , COM10), IP Address ⑥ indicates the IP address of the camera 40. Trend ⑦ is provided for selecting Live or History for searching previously stored data, History Day ⑧ is provided for selecting a date for searching for previous data, and Period ⑨ is provided for selecting a time period, for search.

In the Analog section, Enable ⑩ indicates whether to use displayed data, String ⑪ a data name, Measure ⑫ unit of data, X-Coordinate ⑬ an X-axis coordinate where a text is to be displayed on the screen. Y-Coordinate ⑭ a Y-axis coordinate where a text is to be displayed on the screen, Size ⑮ the size of a text, Color ⑯ the color of a text, Display Status ⑰ selection of Text or Trend, Range Min ⑱ the minimum value of data, Range Max ⑲ the maximum value of data, and Display Time ⑳ the time when a time-domain X coordinate is set among trend coordinates upon display of a trend.

In the Digital Input section, Enable Ⓐ indicates whether to use displayed data, String Ⓑ a data name, X-Coordinate Ⓒ an X-axis coordinate where a text is to be displayed on the screen, Y-Coordinate Ⓓ a Y-axis coordinate where a text is to be displayed on the screen, Size Ⓔ the size of a text, Color Ⓕ the color of a text, Effect Ⓖ the setup of an alerting method (e.g., fast or slow flicker of a text or screen flickering), Display Status Ⓗ selection of Text or Trend, Display Time Ⓘ a time when a time-domain X coordinate is set among trend coordinates upon display of a trend.

In the Digital Output section, Enable Ⓙ indicates whether to use displayed data, String Ⓚ a data name, X-Coordinate Ⓛ an X-axis coordinate where a text is to be displayed on the screen, Y-Coordinate Ⓜ as Y-axis coordinate where as text is to be displayed on the screen, Size Ⓝ the size of a text, Color Ⓞ the color of as text, Effect Ⓟ an alerting method (e.g., fast or slow flicker of a text, or screen flickering), Control Status Ⓠ a function for a program manager to arbitrarily turn on or off the control of the control system 25.

Data such as water level, temperature, and pressure, which have been processed along with an image obtained by capturing a monitored area in the image processing board 10 is stored as a database in the external storage apparatus 104 of the image processing board 10, and the database may be displayed as a trend in the form of a text or graph on the screen. The image may be displayed together with the data. The text may be displayed with predetermined configuration values such as content, unit, position on screen, font, and color. Upon alert, the displayed text may flick in a predetermined color, or the overall screen may flicker in a predetermined color or black and white while the text remains in a predetermined color). When the database regarding various situations is displayed as a data trend in the form of a graph, the text may be displayed in the content, unit, and color as configured by a manager. When a trend bar displayed on the image is moved to a desired time, the time and control system value at the time corresponding to the position to which the trend bar is moved are displayed. After identified, the data value positioned over the trend bar may automatically disappear.

At least a part of the software program or method may be implemented as instructions stored in a computer-readable storage medium e.g., in the term of is programming module. The instructions, when executed by one or more processor, may cause the processor to carry out a corresponding function. The computer-readable storage medium may be e.g., the memory. At least a part of the programming module may include e.g., a module, program, routine, set of instructions, process, or the like for performing one or more functions.

The above-described software program and method may be stored in a computer-readable storage medium in a software-like or hardware-like manner.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and/or the like. Examples of the program instructions may include not only machine language codes but also high-level language codes which are executable by various computing means using, an interpreter. The aforementioned hardware devices may be configured to operate as one or more software modules to carry out exemplary embodiments of the present disclosure, and vice versa.

Modules or programming modules in accordance with various exemplary embodiments of the present disclosure may include at least one or more of the aforementioned components, omit some of them, or further include other additional components. Operations performed by modules, programming modules or other components in accordance with various exemplary embodiments of the present disclosure may be carried out sequentially, simultaneously, repeatedly, or heuristically. Furthermore, some of the operations may be performed in a different order, or omitted, or include other additional operation(s).

As described above, according to an embodiment of the present disclosure, an image processing board may include various external input/output ports, such as, e.g., a digital input port, a digital output port, an analog input port (e.g., 4 mA to 20 mA input), an RS-485 communication port, an RS-232 communication port, a LAN port, and an audio port. The image processing board may be included in a camera, and thus, the above-listed external input/output ports may be directly processed by the camera. Further, the image processing board may provide compatibility with various NVRs adopting different specifications or standards depending on the manufacturers.

According to an embodiment of the present disclosure, a DSP may provide for increased data processing and compression speed. An MPU may pre-process data received through various external input/output ports such as a data input port, a port for controlling contact output and alarm, a data input port, and an analog input (e.g., 4 mA to 20 mA input) port and transmit the pre-processed data to a CPU. The image processing board also includes various communication ports such as an RS-232 communication port, an RS-485 communication port, and a LAN port, and other ports such as an audio port. When such image processing board is included in a camera, the camera may directly process the input data into trend data so that the data trend may be displayed on the monitor screen alongside an image. Accordingly, a manager may efficiently appreciate data such as water level, pressure, and temperature of a monitored area.

According to an embodiment of the present disclosure, the trend data may be displayed in the form of a graph on the screen with an image displayed as background, thus allowing a manager to detect any hazardous situation that may occurs in a monitored area.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. An image monitoring apparatus using an image processing board, the image processing board connected between a control system and a network video recorder (NVR) and embedded in a camera, the image processing board comprising:
   a digital signal processor (DSP) chip;
   a synchronous dynamic random access memory (SDRAM);
   an external storage unit; and
   a plurality of ports including an RS-232/485 communication port, a TCP/IP LAN port, a port for controlling a digital output, a contact output, and an alert, a digital port, an analog input port, an RS-485 communication port, an audio port, and a multipoint control unit (MCU) external input/output port, wherein the image processing board is configured to support various protocols of an external device communicating with the control system through RS-485 communication, a LAN, or a Modbus, wherein data processed by the image processing board is displayed by the NVR on a monitor as a situation including a water level, a temperature, and a pressure, wherein when a dangerous or alert situation occurs, a message is displayed on the monitor or an overall screen of the monitor flickers, wherein the image processing board is configured to simultaneously perform an image processing function and an external device control function, wherein the image processing board is configured to encode an compressed image and input data together with the compressed image and to send the encoded data to the NVR, and wherein the NVR including a decoder is configured to restore the compressed image, and the NVR is configured to display various input data including the temperature and the pressure received from the external device on a lower portion of the monitor.

2. The image monitoring apparatus of claim 1, wherein when the dangerous or alert situation occurs, the displayed message flickers in a predetermined color, or the overall screen flickers in a predetermined color or in black and white with the displayed message remaining in a predetermined color.

3. The image monitoring apparatus of claim 1, wherein the image monitoring apparatus is configured to, when the dangerous or alert situation occurs, announce the dangerous or alert situation through a speaker and send a text message or a voice message to a manager.

4. The image monitoring apparatus of claim 1, wherein the NVR includes a plurality of image display apparatuses, wherein the image processing board is connected with one of the plurality of image display apparatuses, and wherein when a water level or amount in a predetermined area reaches a predetermined value, an emergency broadcast is provided to the predetermined area.

5. The image monitoring apparatus of claim 1, wherein the image processing board is configured to support various protocols to receive data from a control system through the RS-232/485 communication port, the LAN port, and the external input/output port, wherein the protocols include a protocol of LSIS Co. Ltd., a Modbus, and a Profibus.

6. The image monitoring apparatus of claim 1, wherein the image processing board is configured to use an image compression design method using a DSP to compress an image, and wherein the image compression design method using the DSP comprises:
   compressing a signal received from a camera using the DSP;
   temporarily storing the compressed signal in the SDRAM under control of the CPU;
   pre-processing external data received through the external input/output port by an MCU;
   transmitting the pre-processed data to the CPU to create a database in the external storage unit; and
   transmitting the pre-processed data to the CPU through a communication port connected with a communication chip to create a database in the external storage unit, displaying text data and a trend using the database under control of the CPU, and transmitting an image to a monitoring center.

7. The image monitoring apparatus of claim 1, wherein data including a water level, a temperature, and a pressure, which are processed along with an image obtained by capturing a monitored area by the image processing board is stored as a database in the external storage apparatus, wherein the database together with the image is displayed as a data trend in the form of a text or graph on the screen, wherein the text is displayed so that predetermined values including a content, a unit, a position on the screen, a font, and a color may be configured, wherein when a trend bar displayed on the image is moved to a desired time, a time and a control system value corresponding to a position to which the trend bar is moved are displayed, and wherein after identified, the data value positioned over the trend bar automatically disappears.

8. The image monitoring apparatus of claim 1, wherein when the image processing board is not positioned near a camera, a control system is connected with the camera through a network to collect data from the control system, wherein data is transmitted from the control system to the image processing board via the network and the TCP/IP LAN port of the image processing board to create a database using the transmitted data, and wherein the database, together with an image, is sent to a monitoring center and is displayed on the screen.

* * * * *